United States Patent [11] 3,629,508

[72] Inventor Roger C. Glidden
12 Pleasant St., Wenham, Mass. 01984

[21] Appl. No. 858,437
[22] Filed Sept. 16, 1969
[45] Patented Dec. 21, 1971

[54] VISUAL READOUT RECEIVER
18 Claims, 7 Drawing Figs.

[52] U.S. Cl. 179/5 R, 179/6 E
[51] Int. Cl. H04m 11/04
[50] Field of Search 179/5 R, 5 P, 6 R, 6 E

[56] References Cited

UNITED STATES PATENTS

| | | | |
|---|---|---|---|
| 3,427,402 | 2/1969 | Stokes | 179/5 R |
| 3,531,597 | 9/1970 | Andrews et al. | 179/5 P |
| 3,480,730 | 11/1969 | Ritchey et al. | 179/5 P |
| 3,390,234 | 6/1968 | Glidden | 179/5 |

*Primary Examiner*—Kathleen H. Claffy
*Assistant Examiner*—David L. Stewart
*Attorneys*—Clarence A. O'Brien and Harvey B. Jacobson

ABSTRACT: A coded message receiver at a dialed telephone station loads the lines in response to a gating tone, by setting into operation readout devices such as a magnetic tape recorder and an impulse counter as well as an audible alarm. During an ensuing message period, code signal tone bursts transmitted through the lines are recorded and counted. Upon completion of the message period, operation of the readout devices is terminated and the receiver circuit conditioned for reset. The output of the alarm is increased to signal message reception so that message repetition and return signaling may be effected by actuation of switches.

Roger C. Glidden
INVENTOR.

BY Clarence A. O'Brien and Harvey B. Jacobson
Attorneys

Roger C. Glidden
INVENTOR.

BY Clarence A. O'Brien and Harvey B. Jacobson
Attorneys

Roger C. Glidden
INVENTOR.

BY Clarence A. O'Brien
and Harvey B. Jacobson
Attorneys

VISUAL READOUT RECEIVER

This invention relates to communication systems and more particularly to the handling and processing of transmitted information at a receiving station.

With respect to automatic reporting of monitored conditions at remotely located stations, such as disclosed in my prior U.S. Pat. No. 3,390,234, there is often a special need for personnel-supervised receiving equipment at an information receiving and collecting station. So as to meet different installational requirements, such receiving equipment must be versatile in use, compact and simple to operate and install. It is therefore an important object of the present invention to provide information-receiving equipment for automatic telephone reporting systems capable of being utilized with a commercial communication system without reliance on any external source of energy.

In accordance with the present invention, an information-receiving station is provided with receiving equipment adapted to be connected to the usual telephone lines of a commercial communication system from which it is powered and to receive reports from a reporting station having automatic transmitting equipment such as disclosed in my prior U.S. Pat. No. 3,390,234. When the receiving station is dialed, and full line voltage is established across the telephone lines at the receiving station, a storage capacitor is charged to maintain a supply of operating current for a band-pass amplifier through a current indicator associated with the receiving equipment as well as to store energy in another capacitor for subsequent signal-processing purposes. A gate tone signal superimposed on the full line voltage is thereby recognized and amplified by the band-pass amplifier to charge another capacitor so that when the gate tone signal ceases, the capacitor discharges to latch in remote signaling relays and a load relay to thereby load the telephone lines with an audible alarm, a tape recorder and a delay circuit. This loading of the telephone lines produces a reduction in line voltage which is characteristic of the usual telephone communication system whenever the telephone lines at a receiving station are loaded by removal of the handset from the telephone instrument. When the telephone lines are loaded by the receiving equipment in accordance with the present invention, a low-level output is produced from the audible alarm for a fixed period of time during which coded signals in the form of tone bursts are transmitted over the telephone lines to the receiving station. These coded signals when amplified by the band-pass amplifier are fed to the tape recorder previously set into operation and to a remote signaling device such as a radio transmitter that may be associated with the receiving equipment. Also, the amplified coded signals cause discharge of a storage capacitor to pulse a readout counter for displaying the coded information received. An audible indication of the recorded and visually displayed code signals may also be produced on the alarm by momentary increase in its output level to produce alarm pulses. At the end of the message period as determined by the delay circuit, an unloading relay is rendered operative to remove power from the delay circuit and tape recorder and at the same time increases the output level of the alarm to a higher steady level. The remote signaling devices are also reset while the receiving equipment is conditioned for repeated message reception. The high-level output of the alarm is maintained for an indefinite period thereafter in order to keep the telephone lines loaded until a repeat switch is actuated by personnel causing reset of the counter. Full line voltage is then restored as capacitors are recharged to full capacity in order to permit recycling in response to dialing of the receiving station once again. Once the receiving equipment has recycled a sufficient number of times to repeat the information to the satisfaction of personnel at the receiving station, a terminate call switch may be actuated producing the same action as the repeat switch and in addition thereto operating a return signaling device for a short period of time in order to dispatch a signal to the transmitter from which the information originates and thereby terminate recycling operation of the transmitter.

The receiving equipment is also provided with various features to assure proper handling and processing of information as well as to obtain operational reliability. For example, should any malfunction occur in the tape recorder before the message period begins, the audio alarm is energized prematurely in an abort mode of operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
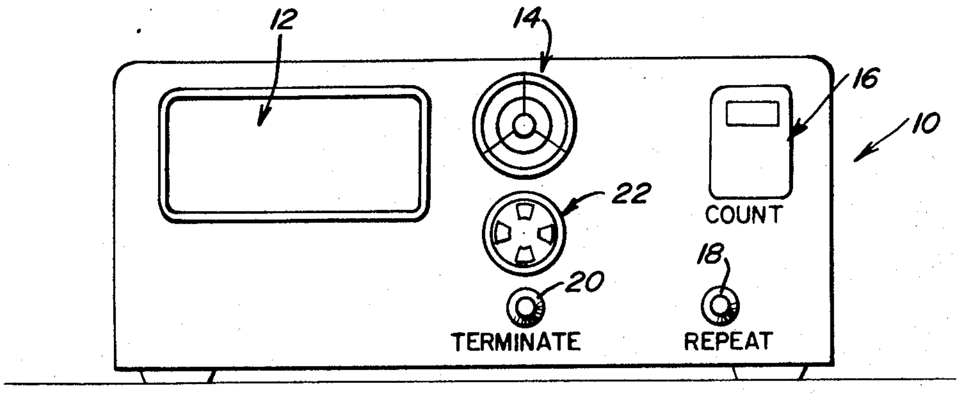
FIG. 1 is a front elevational view illustrating one embodiment of receiving apparatus constructed in accordance with the present invention.

Referring now to the drawings in detail, FIG. 1 illustrates a receiving apparatus generally denoted by reference numeral 10 adapted to be connected across the telephone lines at a receiving or information collecting station in lieu of the usual telephone instrument. Accordingly, whenever this receiving station is dialed from some reporting station, and a communication link is established by the usual telephone exchange equipment, a gating tone is transmitted to the receiving station to which the receiving apparatus 10 responds by loading the telephone lines. As soon as the full line voltage, usually 48 v. DC is established across the telephone lines at the receiving station, operation of the receiving apparatus is initiated as indicated by illumination of a current indicator 22. When the telephone lines are loaded by the apparatus, a suitable magnetic tape recorder 12 mounted in the apparatus cabinet, is set into operation and a low-level output is produced from an audible alerting device 14. The recorder 12 as well as the alerting device 14 are operative during a message period to register code signals in the form of tone bursts transmitted through the telephone lines. These tone bursts are also counted by an impulse-type counter 16 so as to provide a visual display of code digits. At the end of the message period, a higher level output is produced from the alerting device 14 in order to signify to personnel that the message portion of the cycle is completed. The pushbutton repeat switch 18 may then be actuated in order to cause recycling of the receiving apparatus for repeat message reception. When the personnel is satisfied with the information received, after the next message period, the pushbutton terminate switch 20 may be actuated in order to reset the apparatus as well as to produce a return signal dispatched to the reporting station through the telephone lines in order to terminate recycling of the transmitting equipment.

Figure 4:
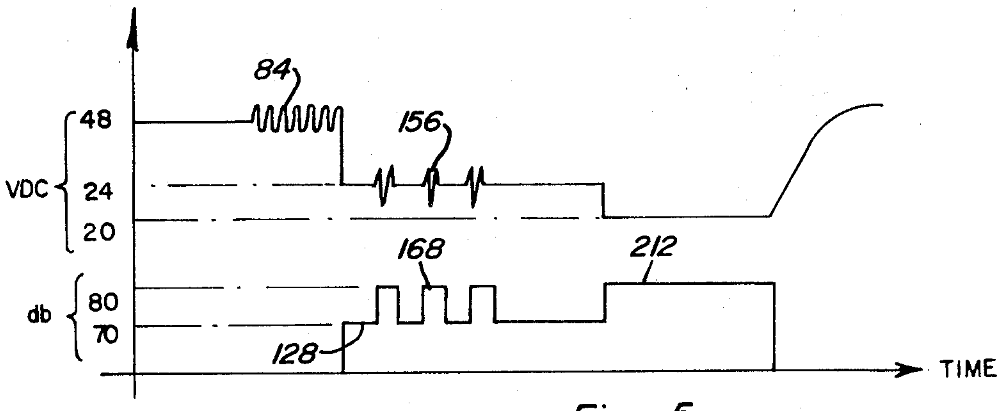
FIGS. 4 and 5 are graphical diagrams illustrating the operational characteristics of the receiving apparatus.

As hereinbefore indicated, full line voltage is established across the telephone lines at a receiving station upon completion of the dialing operation from a transmitter at a reporting station. Thus, a full line voltage of 48 v. DC for example is initially applied to the receiving apparatus at the beginning of an operational cycle as shown in FIG. 4. A gating tone 84 of 1.08 kilocycles, for example, is then superimposed on the full line voltage by the transmitting apparatus. When the gating tone 84 ceases under control of the transmitting equipment, a message period of fixed duration begins. In the illustrated embodiment, the message period is 8 seconds and as shown in FIG. 4, the message period is characterized by a reduction in the line voltage to 24 v. DC for example, accompanying the loading of the lines by readout devices. Coded signals in the form of tone bursts 156 are superimposed on the reduced line voltage during the message period. The tone bursts 156 in the described embodiment are also characterized by a frequency of 1.08 kilocycles. At the end of the message period, there is a further reduction in the line voltage to 20 v. DC for example, coinciding with an increased loading imposed on the telephone lines by the receiving apparatus. It will be apparent from FIG. 4, that the first reduction in line voltage to 24 v. DC corresponds with a steady, low-level output 128 from the alerting device 14 of 70 decibels. The output of the alerting device is increased to a high-level output 212 of 80 decibels at the end of the message period as also shown in FIG. 4 corresponding to the second reduction in line voltage. During the message period, the tone bursts 156 superimposed on the reduced line voltage are operative to produce corresponding, momentary increases in the output of the alerting device as shown by pulses 168 in FIG. 4. The output of the alerting device and loading of the telephone lines is interrupted by actuation of the repeat switch 18 causing an increase in the line voltage toward full value.

Figure 5:
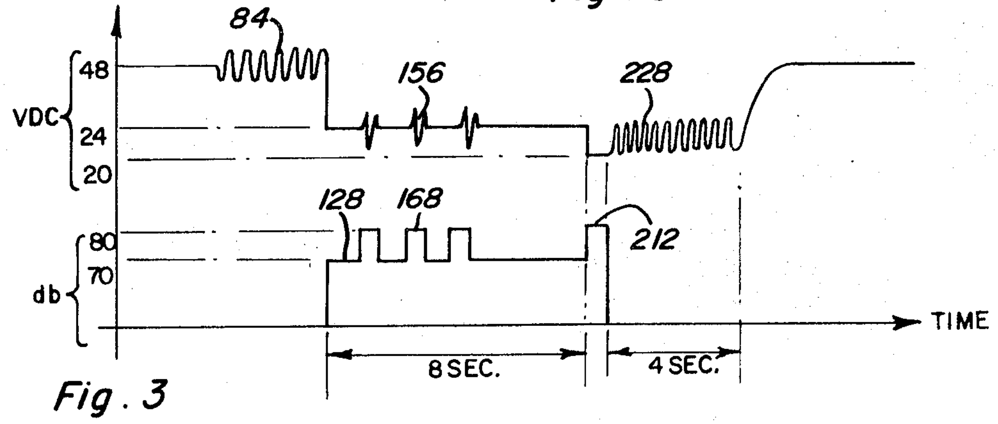

The graph of FIG. 5 illustrates the same operational sequence as that of FIG. 4 except that the high-level output 212 of the alerting device is interrupted by actuation of the terminate switch 20 producing a return signal tone 228 for a fixed duration of 4 seconds, for example. At the end of the return signal tone 228, the line voltage again increases toward full value as shown in FIG. 5.

Figure 2:
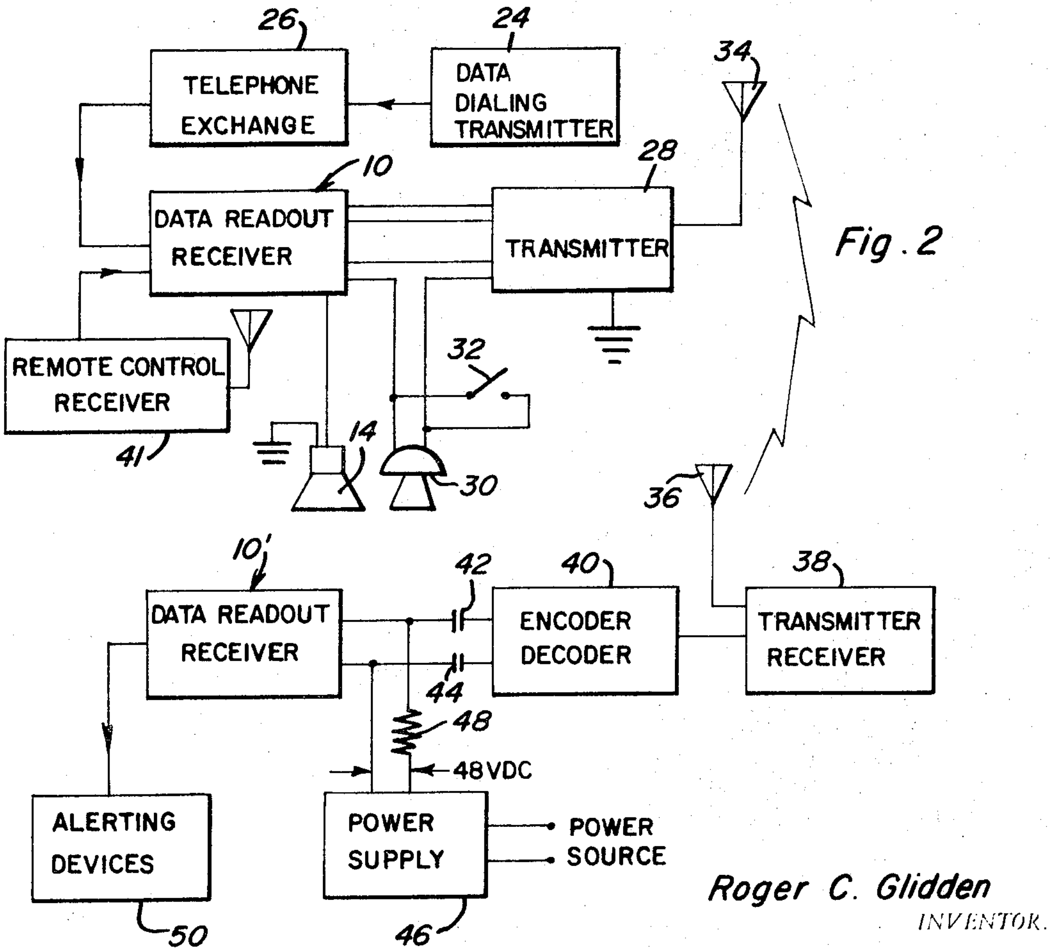
FIG. 2 is a schematic block diagram illustrating a typical communication system with which the receiving apparatus may be associated.

Referring now to FIG. 2, a typical communication system is diagrammatically illustrated showing a data-dialing transmitter 24 at a reporting station which has certain characteristics. The transmitter 24 for example will report a condition being monitored by automatically dialing the receiving station through the telephone exchange 26 and then produce the gate tone 84 aforementioned in connection with FIG. 4. The transmitter 24 is also programmed so that a message period begins upon termination of the gating tone. A predetermined code stored on the code disk associated for example with the transmitter, will produce the tone bursts 156 aforementioned during the message period. After the message period, the transmitter undergoes a hangup period before it recycles if no stop signal response is received from the dialed station, as disclosed for example in my prior U.S. Pat. No. 3,390,234 aforementioned.

The apparatus 10 at the receiving station in addition to producing an output from the alerting device 14 as aforementioned, also transmits the information to a radio transmitter 28 so as to modulate its carrier frequency output. The modulating input to the transmitter 28 may originate either from the receiver apparatus 10 upon closing of switch 32 or from a microphone input 30. Also, the message-repeating and cycle-terminating functions of the switches 18 and 20 aforementioned in connection with FIG. 1, may be automatically performed by a remote control receiver 41.

With continued reference to FIG. 2, it will be noted that the output of the remote signaling transmitter 28 is radiated from antenna 34 to the antenna 36 associated with a remotely located radio transmitter and receiver component 38. Information may accordingly be transmitted to and from the transmitter-receiver component 38 to an encoder-decoder component 40 from which information may be transmitted through signal coupling capacitor 42 to a data readout receiver 10' similar to that of receiver apparatus 10. Receiver 10' however, will not be connected to the telephone lines and accordingly is powered from an available external power source through power supply component 46 and voltage-dropping resistor 48 by means of which the 48-v. DC operating energy is made available. Alerting devices 50 may be associated with the receiver 10' and return signals from the receiver 10' may be transmitted through the signal-coupling capacitor 44 to the encoder-decoder component 40 so that the return signal may be transmitted by the component 38 to the remote control receiver 41 for remote control of the repeat and terminate switches 18 and 20.

It will be appreciated that FIG. 2 illustrates a telephone-radio type of communication system in which a receiver constructed in accordance with the present invention is utilized both at a stationary receiving station and at a mobile station. Wherever it is used, the receiver as diagrammatically shown in FIG. 3 basically includes energy storage means 190 connected to a common power and signal input from which power is furnished to relay and delay circuit components generally denoted by reference numeral 208 programming operation of the receiver apparatus. Both the gating tone signal 84 aforementioned and the code tone bursts 156 are transmitted through a band-pass amplifier 66 to the readout devices 210 including the tape recorder 12, the counter 16 and the remote signaling transmitter 28 as aforementioned. The band-pass amplifier 66 handles signals of a common fixed frequency such as 1.08 kilocycles in order to prevent unauthorized operation of the receiving apparatus. A band-pass amplifier suitable for the purpose is disclosed for example in my prior copending application U.S. Ser. No. 843,339, filed July 22, 1969.

Figure 3:
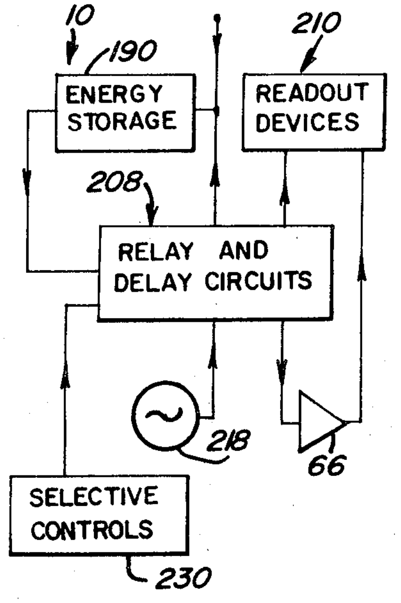
FIG. 3 is a schematic block diagram corresponding to one of the receiving devices.
Figure 7:
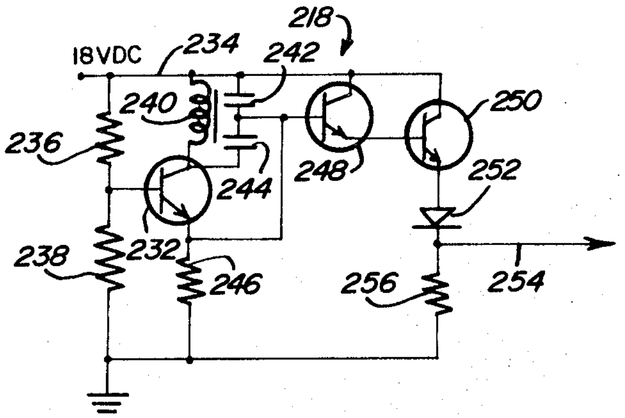
FIG. 7 is an electrical circuit diagram of a return signaling oscillator utilized in the circuit illustrated in FIG. 6.

FIG. 3 also diagrammatically illustrates selective controls 230 associated with the receiver apparatus. These controls include, for example, the repeat and terminate switches 18 and 20 aforementioned. Also as previously indicated, through the selective switch control 20, a return signal is dispatched to the telephone line or input to the receiver apparatus. This return signal may be a tone of a different frequency such as 2.08 kilocycles generated by oscillator 218. FIG. 7 illustrates an oscillator circuit suitable for this purpose which includes transistor 232 to which base bias is applied from an 18-v. DC voltage line 234 through a voltage-dividing network including resistors 236 and 238. Collector bias is applied from the voltage line to the collector of the transistor through an inductance coil 240 in a tank circuit which includes the capacitors 242 and 244 determining the frequency of the output signal appearing at the emitter of the transistor connected to ground through the emitter resistor 246. The oscillating output signal is applied to the base of an amplifier transistor 248 connected to the juncture between the capacitors 242 and 244. DC bias is applied to the collector of transistor 248 and the output transistor 250, the base of which is connected to the emitter of transistor 248. The oscillating signal output from the emitter of transistor 250 is conducted through diode 252 to the output signal line 254 separated from ground by the resistor 256. The diode 252 protects the transistor junctions from overvoltage transients.

Figure 6:
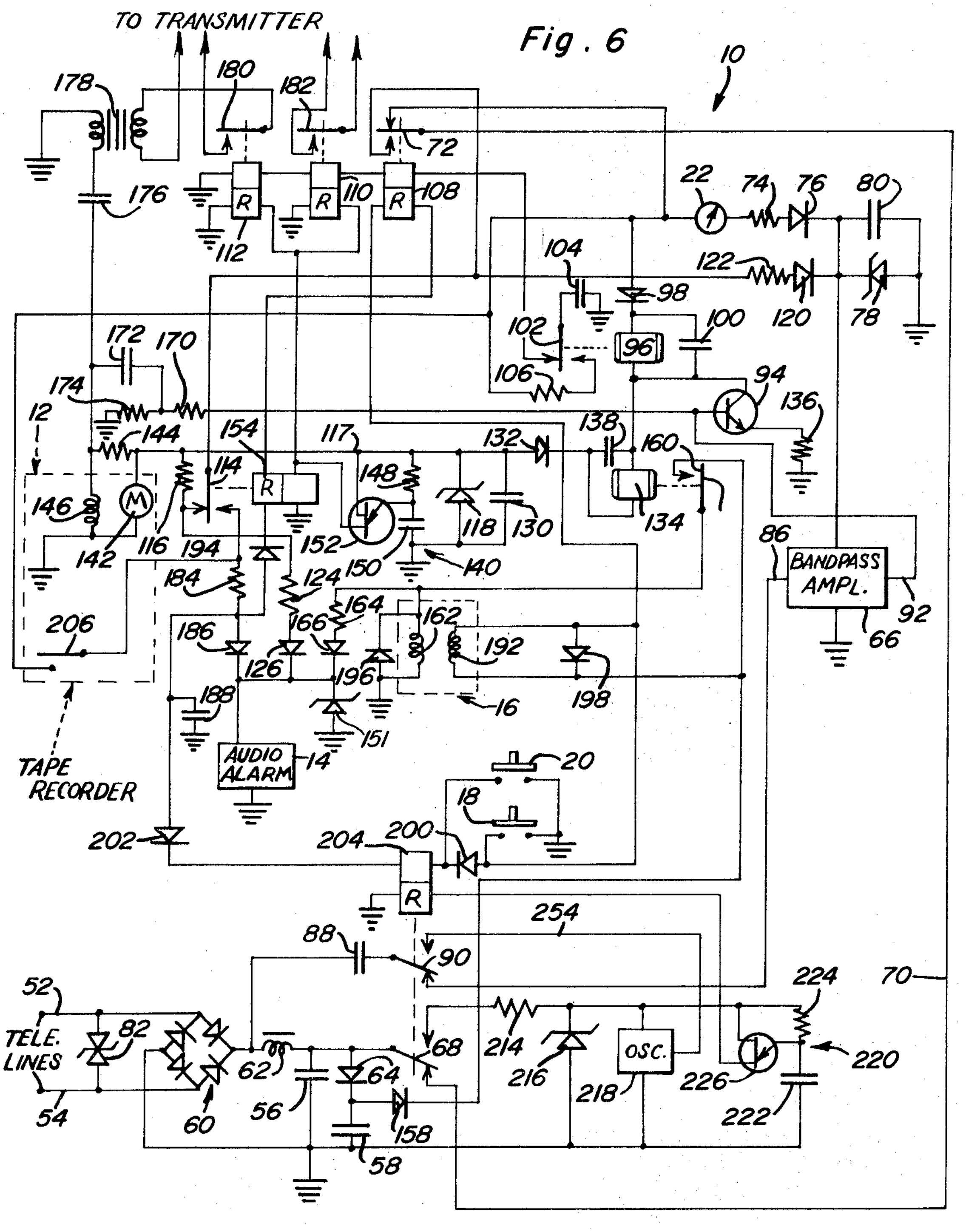
FIG. 6 is an electrical circuit diagram corresponding to a receiving apparatus constructed in accordance with the present invention.

FIG. 6 illustrates in detail the circuit associated with the receiving apparatus 10. The power and signal input to the receiving apparatus is in the form of telephone lines 52 and 54 connected across the input terminals of a full-wave rectifier 60 in parallel with a pair of back-to-back Zener diodes 82. The negative terminal of the rectifier 60 is connected to ground while the positive output terminal is connected through an inductance coil 62 to a storage capacitor 56 and through diode 64 to a second storage capacitor 58. Thus, voltage is supplied from the ungrounded terminal of capacitor 56 to the various components of the receiver circuit and from the ungrounded terminal of capacitor 58 through a diode 158 to other components of the receiver circuit.

When the full line voltage of 48 v. DC is established across the telephone lines 52 and 54 upon completion of the dialing operation of transmitter 24 for example, capacitor 56 is charged through the full wave rectifier 60 and inductance coil 62 while the capacitor 58 is charged through the diode 64. Operating current is thereby supplied through relay switch 68 in its normal position as illustrated in FIG. 6, voltage line 70 and relay switch 72 in its normal position to current indicator 22 from which the operating current is conducted through resistor 74 and diode 76 to the band-pass amplifier 66. The Zener diode 78 connected in parallel with the shunt capacitor 80 clamps the power supply voltage to the band-pass amplifier at 7 v. DC Thus, as soon as the receiving station at which the receiving apparatus is installed, is dialed, the band-pass amplifier 66 is rendered operative for signal transmission purposes.

In accordance with the present invention, the gating tone 84 aforementioned is superimposed on the full line voltage before any ringing voltage is applied to the dialed station by equipment at the telephone exchange. Should a ringing voltage appear however, the back-to-back Zener diodes 82 will clip the voltage peaks and thereby load the lines so as to signal the exchange and cause disconnecting of the ringing device. When the gating tone 84 ceases, the receiving apparatus loads the telephone lines in order to drop the line voltage to 24 v. DC for example which would also signal the exchange and prevent operation of the ringing device.

The gating tone 84 is fed to the input 86 of the band-pass amplifier 66 through the signal-coupling capacitor 88 as shown in FIG. 6 and the relay switch 90 in its normal position. The inductance coil 62 prevents signal loading of the capacitor 56. If the gating tone is at the proper frequency, an amplified gating tone signal at the output 92 of amplifier 66 drives the transistor 94 to switch it on during the positive halves of the gating signal 84. When the transistor 94 is switched on, it completes an energizing circuit from the relay switch 72 in its normal position through diode 98 and relay coil 96 to ground through resistor 136. Capacitor 100 connected across the terminals of relay coil 96 filters the current to maintain the relay 96 energized. When energized, relay coil 96 displaces the relay switch 102 from its normal position illustrated in FIG. 6 to a position connecting the ungrounded terminal of storage capacitor 104 to the voltage supply line 70 through charging resistor 106 and the relay switch 72 in its normal position. Therefore, when the gating tone 84 ceases and the relay coil 96 is deenergized, the relay switch 102 returns to its normal position illustrated in FIG. 6 so that the charged capacitor 104 may discharge through the series-connected relay coils 108, 110 and 112 causing associated relay switches 72, 182 and 180 to be latched in an actuated position. At this time, loading of the telephone lines is accomplished since the actuated relay switch 72 then connects the voltage supply line 70 to load line 117 through relay switch 114 in its normal position and resistor 116. The load line 117 loads the telephone lines since the delay circuit 140 and the tape recorder 12 are supplied with operating current through the load line 117. A predetermined voltage is maintained on the load line 117 by the Zener diode 118 and the shunt capacitor 130 connected in parallel therewith. Also, a current path is established through diode 132 to relay coil 134 connected in parallel with filter capacitor 138. Relay coil 134 accordingly replaces deenergized relay coil 96 as the relay load on the telephone lines under the reduced line voltage condition during the message period. However, in the absence of any code signals, the current conducted through the relay coil 134 is insufficient to actuate the normally opened relay switch 160 associated therewith.

Current supplied from voltage line 70 through actuated relay switch 72 to relay switch 114 in its normal position, is also conducted during the message period to the audio alarm device 14 through resistor 124 and diode 126 producing the low-level output 128 of 70 decibels as indicated in FIGS. 4 and 5. The current conducted to the loading line 117 through resistor 116 on the other hand is fed to the motor 142 associated with the tape recorder and through bias resistor 144 to the recording coil 146. Accordingly, the tape recorder is set into operation. Also, current conducted through the load line 117 is supplied through charging resistor 148 to the storage capacitor 150 associated with the time delay circuit 140 in order to initiate the 8-second timing cycle aforementioned for the message period.

During the message period, because of the reduction in the line voltage, operating current for the amplifier 66 is conducted from the actuated relay switch 72 through resistor 122 and diode 120. The resistor 122 has a lower resistance than that of resistor 74 so as to allow sufficient operating current under the reduced line voltage condition necessary to maintain the amplifier 66 in proper operating condition. The tone burst signals 156 transmitted through coupling capacitor 88 and relay switch 90 to the input 86 of the amplifier are amplified and transmitted from output 92 to the voltage-dividing network including resistors 170 and 174 in order to feed an attenuated signal through the signal-coupling capacitor 172 to the recording coil 146 of the tape recorder. Thus, the code signals are recorded on magnetic tape. At the same time, the attenuated signals are transmitted through the signal-coupling capacitor 176 to the primary winding of isolation transformer 178, the secondary winding of which is connected to the remote signaling transmitter through the actuated relay switch 180 associated with latching relay coil 112. Since the relay switch 182 associated with relay coil 110 was latched at the same time as relay switch 180, the operating circuit associated with the remote signaling transmitter is also completed.

The code signals 156 are also applied to the base of transistor 94 to momentarily switch the transistor on and momentarily energize relay coil 134. Momentary closing of the associated relay switch 160 supplies current from the capacitor 58 through diode 158 to the audio alarm 14 through resistor 164 and diode 166 in order to produce the pulses 168 on the output of the alarm device 14, as shown in FIGS. 4 and 5. It should be noted in this regard, that the capacitor 58 from which energy is obtained to pulse the output of the alarm device, was previously charged to the full line voltage value and blocked from discharge by diode 64 under the reduced voltage condition during the message period. The input voltage to the alarm is limited by the Zener diode 151 connected between ground and the input terminal of the alarm. The same current pulses supplied to the audio alarm 14 are also supplied to the count coil 162 of the impulse counter 16. Thus, the code signal tone bursts are counted and visually displayed by the counter 16 at the same time that they are recorded on the tape recorder and rendered audible through the alarm device.

At the end of the message period, the capacitor 150 associated with the time delay circuit 140 is sufficiently charged to trigger the unijunction device 152 thereby conducting energizing current from the load line 117 through the unloading relay coil 154 actuating the relay switch 114 to a latched position. Current is also conducted from the load line 117 by the unifunction device 152 to the reset terminals of relay coils 110 and 112 so as to interrupt operation of the remote signaling transmitter. The latched relay coil 11 associated with the unload relay coil 154 transfers power to the audio alarm device 14 through resistor 184 and diode 186 and at the same time disconnects power from the tape recorder 12 and the time delay circuit 140. Thus, while the readout devices are reset by removal of power therefrom, the audio alarm 14 remains energized to produce the output 212 at a higher level of 80 decibels, for example, to maintain the telephone lines more heavily loaded, as shown in FIG. 4. While current is being supplied to the audio alarm 14 through diode 186, capacitor 188 is rapidly charged through resistor 184.

Personnel at the receiving station will be alerted by the increased amplitude of the audio alarm output signifying completion of the message period. Accordingly, if it is desired to have the message repeated, the repeat pushbutton switch 18 is momentarily closed to complete a grounded reset circuit from diode 158 through reset coil 192 associated with counter 16. A grounded circuit is also established by closing of the switch 18 through the reset terminal of load relay coil 108 in series with the reset terminal of unload relay coil 154 through diode 194 from the ungrounded terminal of capacitor 188. Accordingly, resetting current is supplied from the previously charged capacitor 188 through the relay coils 154 and 108 and the reset coil 192 in order to reset the receiving circuit to await another call and reset the counter to zero. Diodes 196 and 198 connected across the coils 162 and 192 of counter 16 protect the contacts from transient voltages resulting from counter coil drive pulses. Diode 200 prevents capacitor 188 from discharging through diode 202 and return signal relay coil 204 in response to actuation of the repeat switch 18. It will also be apparent, that while the load and unload relay coils 108 and 154 and the counter 16 are reset, the alarm 14 continues to load the lines so that a busy signal is established through the telephone exchange when the transmitter disconnects. No other incoming calls can therefore occur. Line voltage then rises to full value as shown in FIG. 4 as capacitors 56 and 58 are recharged. When these capacitors reach full charge and charging current becomes small, recycling of the transmitter produces a repeat call operation through the receiving apparatus.

After the operational cycle of the receiving apparatus has been repeated several times, if necessary, the terminate call switch 20 may be momentarily closed after the message period has been completed in order to complete a grounded circuit from the capacitor 188 through diode 202 and the return signal relay coil 204. A grounded circuit is also completed from the capacitor 188 through the diode 194, the series-connected reset terminals of the relay coils 154 and 108 as well as a grounded circuit from diode 158 through counter reset coil 192 and diode 200. Thus, in addition to pulsing the relay coil 204, terminate switch 20 also performs the same functions as performed by the repeat switch 18. Pulsing of the relay coil 204 actuates the relay switches 68 and 90 to latched positions disconnecting the telephone lines through inductance coil 62 and coupling capacitor 88 from the voltage line 70 and input 86 of band-pass amplifier respectively. Thus, power is removed from the readout devices and the signal-transmitting means of the receiving circuit so as to cause resetting of the receiving circuit. At the same time, the relay switch 68 connects the positive terminal of rectifier 60 through inductance coil 62 and voltage-dropping resistor 214 to the oscillator 218 so as to supply the 18-volt DC voltage thereto regulated by the Zener diode 216. The relay switch 90 on the other hand connects the output line 254 from the oscillator to the telephone lines through the signal-coupling capacitor 88 and the rectifier 60. Regulated voltage from the resistor 214 is also supplied to the time delay circuit 220 so as to charge the capacitor 222 thereof through resistor 224 at the same time that the oscillator 218 is set into operation. The output of the oscillator appears as a return signal tone 228 as shown in FIG. 5 that is transmitted through the telephone lines to the reporting station in order to stop automatic recycling of the transmitter as aforementioned. At the end of a time delay cycle of 4 seconds for example, the capacitor 222 is charged sufficiently to trigger the unijunction device 226 which is then rendered operative to conduct current from the regulated voltage line to the reset terminal of the relay coil 204. Resetting of the relay coil 204 thereby restores the relay switches 68 and 90 to the normal positions illustrated in FIG. 6 to thereby complete restoration of the receiving circuit to its quiescent condition awaiting another call.

It will be apparent from the foregoing description, that in addition to the described functions of the receiving circuit, there are other beneficial operating attributes. For example, once operation of the receiving circuit is initiated by an incoming call, the audio alerting device 14 remains energized to load the telephone lines so as to establish a busy signal through the telephone exchange preventing any other incoming calls until operation is completed by actuation of the terminate switch 20. Further, should there be any malfunction of the tape recorder as detected by closing of switch 206, prior to initiation of the message portion of an operating cycle, current will be supplied through the relay switch 72 in its normal position and malfunction-detecting switch 206 to the audio alarm device 14 through resistor 184 and diode 186 prematurely producing a high-amplitude output of the alarm device signifying to the personnel a malfunction. This abort mode of operation of the alarm device by excessively loading the telephone lines before the message period, will prevent normal operation of the receiving circuit until the malfunction condition is removed.

It will also be apparent that whenever the repeat switch 18 is actuated, the impulse counter 16 is reset to zero, the audio alarm device 14 is turned off and the current indicator 22 deenergized. A repeat call over the telephone lines may then initiate another operational cycle of the receiving circuit after the phone connection from the transmitter to the receiver is broken by the action of the transmitter and another connection established upon recycling of the transmitter. Because of the recharging of the capacitors 56 and 58 from the telephone lines, the voltage across the lines rises slowly after closing of the repeat switch 18 so that only after these capacitors have been recharged, and the charging current becomes small, will a repeat call be possible. Prior to recharging of these capacitors, the telephone lines at the receiving station will remain loaded maintaining a busy signal upon disconnection of the transmitter to prevent any other incoming calls. Thus, the receiving circuit utilizes the normal current-sensing properties of the telephone exchange to insure proper and desired operation. With respect to the audio alerting device 14, any suitable mechanism may be utilized including for example a "Mallory Sonalert" transducer. Any suitable impulse counter may be utilized such as a "Sodeco" impulse counter as well as other decimal readout devices. With respect to the latching relay devices hereinbefore described in connection with FIG. 6, these may be of a bifilar wound coil type having bistable relay switches which latch into either position.

Various modifications of the specifically described receiving apparatus and associated system are contemplated. For example, the isolation transformer 178 may be eliminated in favor of a relay responsive to the output of alarm device 14 so as to connect the microphone 30 as illustrated in FIG. 2 into circuit to provide a modulating signal to the remote signalling transmitter 28 by being positioned adjacent to the speaker of the alarm device 14. With respect to the data readout receiver 10' as shown in FIG. 2, this apparatus may be similar to apparatus 10 except that the terminate switch 20 is eliminated and the repeat switch 18 is relabelled "Clear Register." The receiving apparatus may be expanded for handling more complex coded signals by adding additional band-pass amplifiers having different resonant frequencies so as to transmit tone bursts at different frequencies during the message period in succession or simultaneously, in order to drive an additional counter and thereby accumulate additional decimal readouts for a multidigit code. Readout can also be effected through an information-storing matrix automatically addressed at the end of the code transmission period as disclosed for example in my prior copending application, Ser. No. 845,236, filed July 28, 1969. Readout of several code digits may be accomplished through a signal band-pass amplifier by successive stepping of several counter coils as another method for multidigit code readout.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a communication system having message lines across which full line voltage is established at a called information-collecting station, the voltage level dropping to a reduced line voltage upon loading of the lines and wherein a gating signal is adapted to be superimposed on the full line voltage and code signals are adapted to be superimposed on the reduced line voltage, a data receiver connected to the message lines at the information-collecting station comprising readout means for registering the code signals when energized, energy-storing means connected to the message lines for receiving energy therefrom prior to loading thereof, loading means responsive to said gating signal for connecting the readout means to the message lines to energize said readout means and thereby load the message lines, and signal-transmitting means connected to the message line and energized by the energy-storing means for transmitting the code signals to the readout means when the message lines are loaded.

2. The combination of claim 1 including an audible alerting device, power supply means connecting the energy-storing means to the alerting device upon said loading of the message lines for producing an output therefrom during a period of indefinite duration and delay means energized simultaneously with the alerting device for changing the output level of the alerting device upon completion of a message period of predetermined duration.

3. The combination of claim 2 including selective control means connected to the loading means for unloading the readout means from the message lines only after completion of the message period.

4. The combination of claim 3 wherein said readout means includes recorder means connected to the signal-transmitting means for recording said code signals, and means responsive to said code signals for momentarily changing the output level of the alerting device to form signal pulses corresponding to the code signals recorded by the recorder means.

5. The combination of claim 4 wherein the readout means further includes a pulse counter and a signaling device for transmitting said code signals to a location remote from the information collecting station.

6. The combination of claim 5 including return signaling means for generating an output during a period of fixed duration when energized, and means responsive to said unloading of the readout means by the selective control means for transferring energy supplied to the alerting device to the return signaling means and connecting the return signaling means to the message lines.

7. The combination of claim 6 wherein said signal-transmitting means includes a band-pass amplifier passing the gating signal and code signals at a common fixed frequency.

8. The combination of claim 7 including means responsive to malfunction of the recorder means prior to said loading of the message lines for rendering the alerting device operative in an abort mode.

9. The combination of claim 2 wherein said readout means includes recorder means connected to the signal-transmitting means for recording said code signals, and means responsive to said code signals for momentarily changing the output level of the alerting device to form signal pulses corresponding to the code signals recorded by the recorder means.

10. The combination of claim 9 including means responsive to malfunction of the recorder means prior to said loading of the message lines for rendering the alerting device operative in an abort mode.

11. The combination of claim 3 including return signaling means for generating an output during a period of fixed duration when energized, and means responsive to said unloading of the readout means by the selective control means for transferring energy supplied to the alerting device to the return signaling means and connecting the return signaling means to the message lines.

12. The combination of claim 1 wherein said signal-transmitting means includes a band-pass amplifier passing the gating signal and code signals at a common fixed frequency.

13. The combination of claim 2 including means responsive to malfunction of the readout means prior to said loading of the message lines for rendering the alerting device operative in an abort mode.

14. In combination with a communication system having a transmitter at a reporting station at which signals originate, at least one information-collecting station, and a data receiver at the information-collecting station at which said signals are received during at least one data-reporting cycle, alerting means connected to the data receiver for producing a relatively low level output during said data-reporting cycle while said signals are being transmitted to the data receiver, means responsive to termination of said data-reporting cycle for increasing the output of the alerting means to a relatively high level output for a period of indefinite duration, and selective control means for alternatively recycling the transmitter at the reporting station or terminating operation thereof upon completion of the data reporting cycle.

15. The combination of claim 14 where message lines are connected to the data receiver through which said signals are transmitted, said lines being loaded when transmitting the signals.

16. The combination of claim 15 wherein the selective control means includes repeat switch means connected to the message lines for unloading thereof, a return signal device connected to the message lines and rendered operative to transmit a return signal to the transmitter at the reporting station terminating operation thereof, and terminate switch means for simultaneously unloading the message lines and rendering the return signal device operative.

17. The combination of claim 16 including at least a second information-collecting station at which a second data receiver and a second alerting means are located, and radiant energy means for transmitting the signals received at the first-mentioned data receiver to the second data receiver.

18. The combination of claim 15 including at least a second information-collecting station at which a second data receiver and a second alerting means are located, and radiant energy means for transmitting the signals received at the first-mentioned data receiver to the second data receiver.

* * * * *